(12) United States Patent
Park et al.

(10) Patent No.: US 11,364,789 B2
(45) Date of Patent: Jun. 21, 2022

(54) HYBRID POWERTRAIN

(71) Applicants: Hyundai Motor Company, Seoul (KR); Kia Motors Corporation, Seoul (KR)

(72) Inventors: Jong Yun Park, Hwaseong-si (KR); Dong Woo Gwak, Hwaseong-si (KR); Seong Eun Yun, Bucheon-si (KR); Sung Wha Hong, Hwaseong-si (KR); Hyeon Jin Kim, Suwon-si (KR); Jin Seung Lim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 156 days.

(21) Appl. No.: 16/744,966

(22) Filed: Jan. 16, 2020

(65) Prior Publication Data

US 2021/0070162 A1  Mar. 11, 2021

(30) Foreign Application Priority Data

Sep. 11, 2019 (KR) ........................ 10-2019-0112923

(51) Int. Cl.
*B60K 6/547* (2007.10)
*B60K 6/365* (2007.10)
(Continued)

(52) U.S. Cl.
CPC .............. *B60K 6/547* (2013.01); *B60K 6/365* (2013.01); *B60K 6/38* (2013.01); *B60K 6/40* (2013.01);
(Continued)

(58) Field of Classification Search
CPC ...... B60K 6/547; B60K 6/4825; B60K 6/387; B60K 6/38; B60K 6/48; F16H 57/023
See application file for complete search history.

(56) References Cited

U.S. PATENT DOCUMENTS

| 6,865,966 B2 * | 3/2005 | Shimaguchi ......... B60K 28/165 74/336 R |
| 2004/0192493 A1 * | 9/2004 | Nitta ....................... F16H 59/58 475/331 |

(Continued)

FOREIGN PATENT DOCUMENTS

KR  10-2015-0069194 A  6/2015

*Primary Examiner* — Jeffrey J Restifo
(74) *Attorney, Agent, or Firm* — Morgan, Lewis & Bockius LLP

(57) ABSTRACT

A hybrid powertrain may include a first shifting module including a motor input shaft having a motor directly connected to the motor shaft and provided to form two shifting stages having the largest gear ratios in sequence among a series of shifting stages; a second shifting module including an engine input shaft concentrically mounted with the motor input shaft and connected to an engine through a main clutch, and provided to form the remaining shifting stages of the series of shifting stages; a center synchro mounted to intermit the motor input shaft and the engine input shaft; and a continuous variable device provided to implement a state in which the first shifting module forms a gear ratio smaller than a shifting stage having a small gear ratio among the shifting stages of the first shifting module by a continuously controlled friction force.

16 Claims, 23 Drawing Sheets

(51) Int. Cl.
  *B60K 6/38* (2007.10)
  *F16H 57/023* (2012.01)
  *B60K 6/40* (2007.10)
  *B60K 6/48* (2007.10)

(52) U.S. Cl.
  CPC ............. *B60K 6/48* (2013.01); *F16H 57/023* (2013.01); *B60K 2006/4825* (2013.01); *F16H 2200/2064* (2013.01)

(56) References Cited

U.S. PATENT DOCUMENTS

| | | | | |
|---|---|---|---|---|
| 2012/0101677 A1* | 4/2012 | Ikegami | ................ | B60W 10/06 701/22 |
| 2012/0234133 A1* | 9/2012 | Ikegami | ................ | B60W 20/13 74/661 |
| 2015/0051043 A1* | 2/2015 | Beck | ................ | F16H 3/66 475/275 |
| 2015/0087469 A1* | 3/2015 | Beck | ................ | B60K 6/48 475/275 |
| 2015/0119177 A1* | 4/2015 | Park | ................ | B60K 6/547 475/5 |
| 2015/0148188 A1* | 5/2015 | Park | ................ | B60K 6/54 477/5 |
| 2015/0260268 A1* | 9/2015 | Minaminakamichi | | F16H 63/32 475/5 |
| 2016/0223061 A1* | 8/2016 | Park | ................ | F16H 3/006 |
| 2017/0096137 A1* | 4/2017 | Toyama | ................ | B60K 6/547 |
| 2017/0291484 A1* | 10/2017 | Park | ................ | B60W 30/19 |
| 2017/0343081 A1* | 11/2017 | Horiguchi | ................ | F16H 3/093 |
| 2018/0363776 A1* | 12/2018 | Shimozawa | ................ | F16H 61/0021 |
| 2019/0234492 A1* | 8/2019 | Kasuya | ................ | F16H 3/66 |
| 2020/0271197 A1* | 8/2020 | Eo | ................ | F16H 3/006 |
| 2021/0070162 A1* | 3/2021 | Park | ................ | F16H 3/126 |

\* cited by examiner

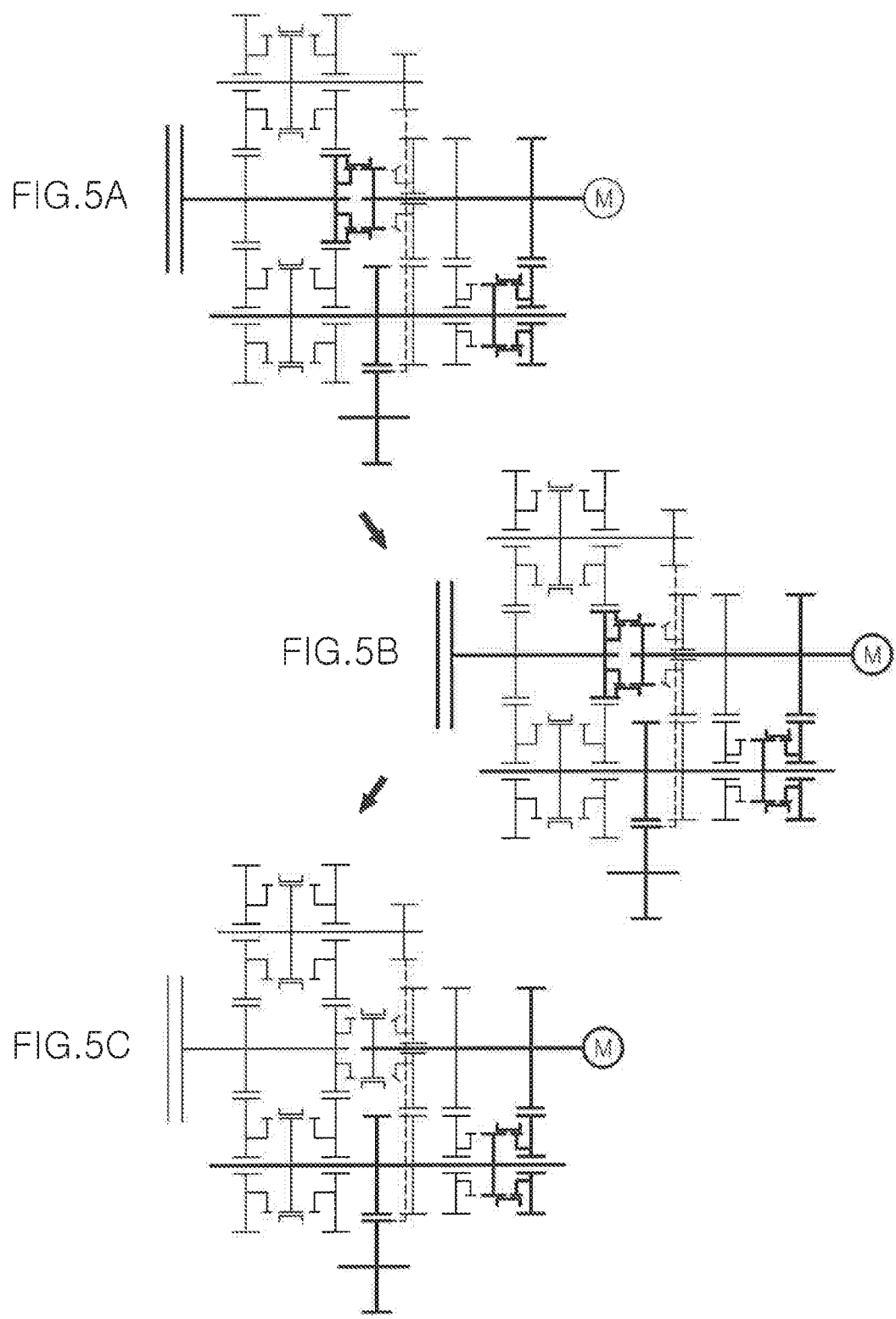

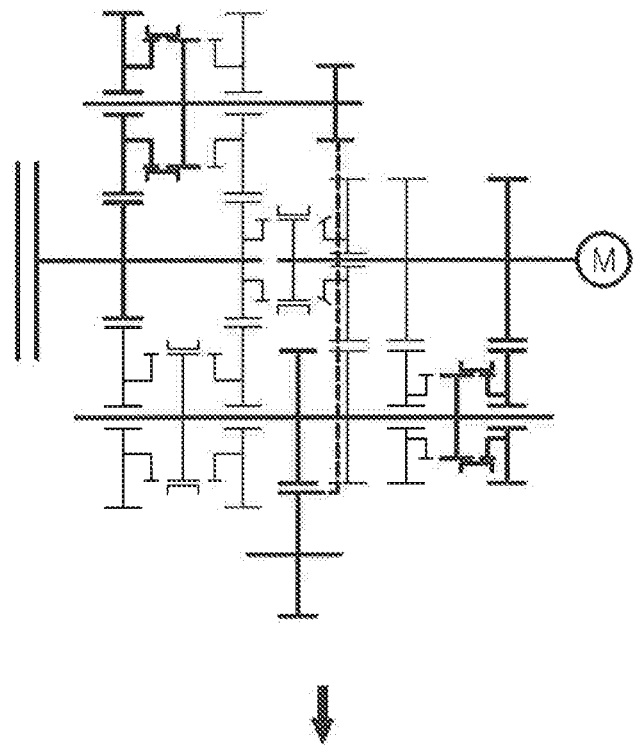
FIG.6A
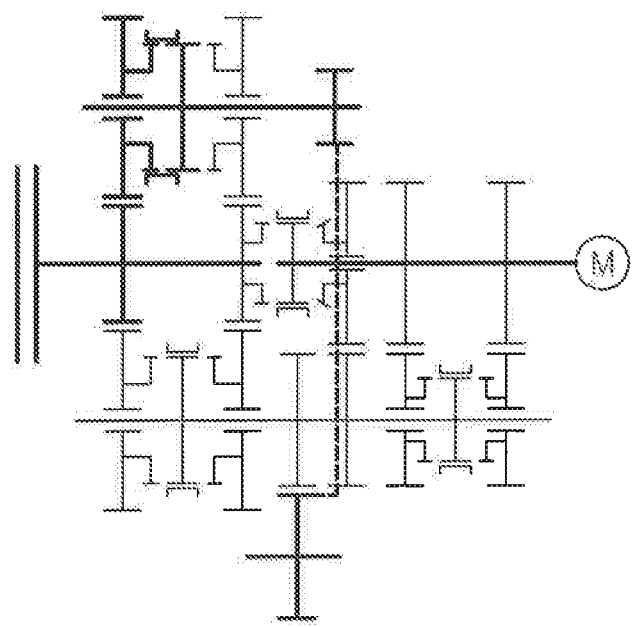
FIG.6B

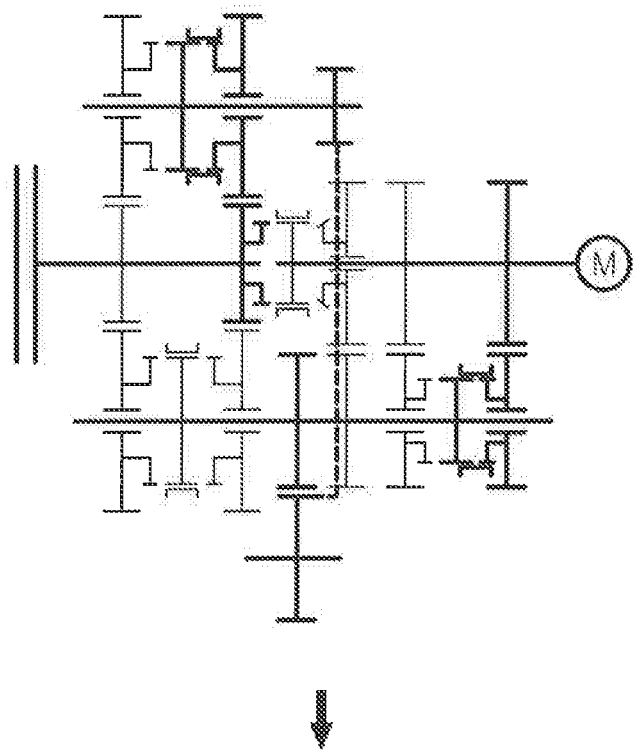
FIG.8A
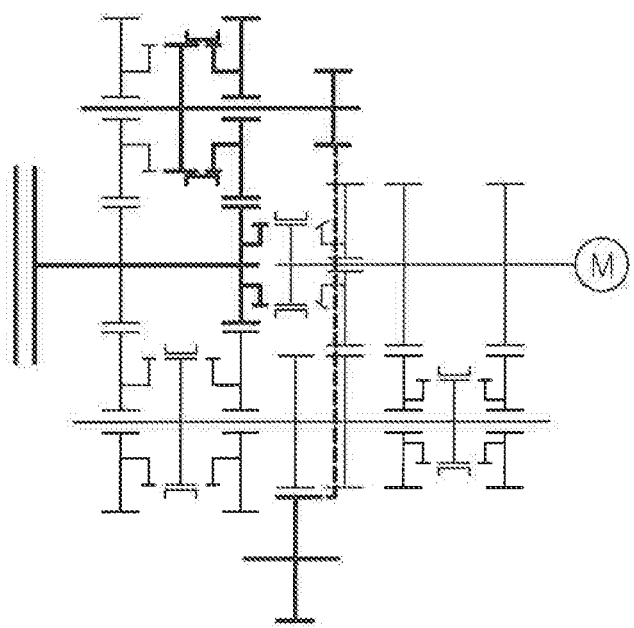
FIG.8B

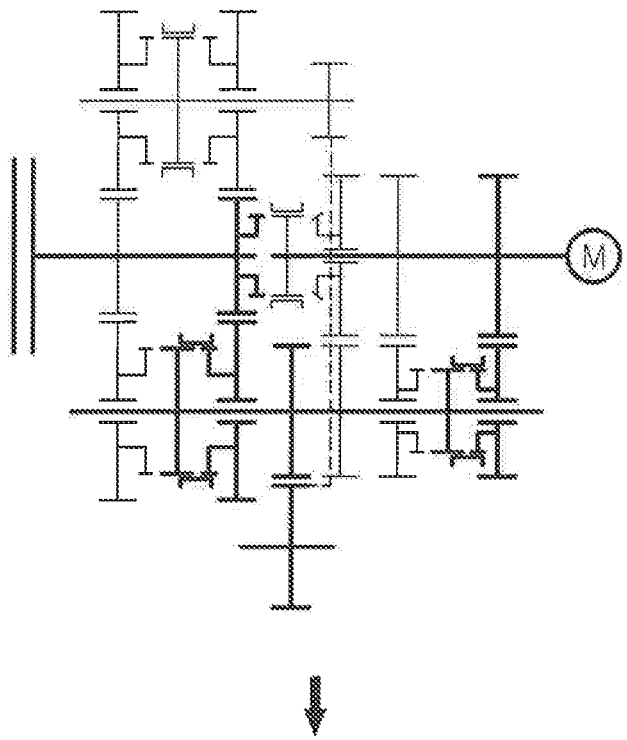
FIG.12A
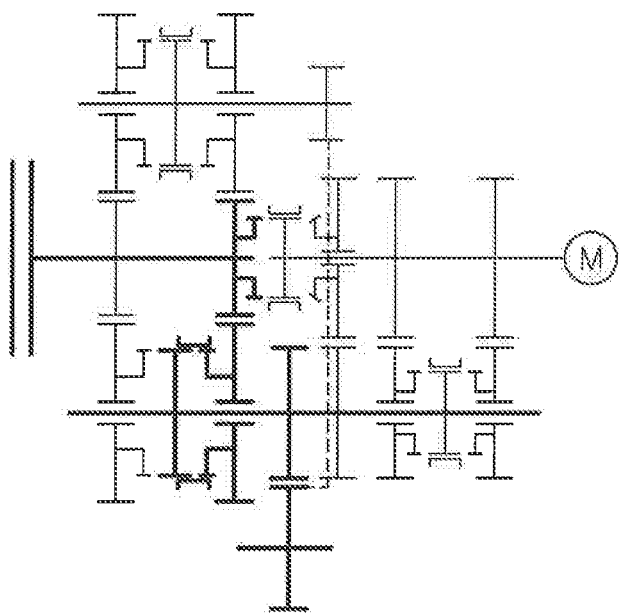
FIG.12B

HYBRID POWERTRAIN

CROSS REFERENCE TO RELATED APPLICATION

The present application claims priority to Korean Patent Application No. 10-2019-0112923, filed Sep. 11, 2019, the entire contents of which is incorporated herein for all purposes by this reference.

BACKGROUND OF THE INVENTION

Field of the Invention

The present invention relates to a layout of a hybrid powertrain which may be applied to a vehicle.

Description of Related Art

An automated manual transmission (AMT) may be evaluated as the most competitive transmission in terms of cost, material cost, and fuel efficiency among the automatic transmissions, but it is not widely used because it hinders merchantability of a vehicle due to torque interruption generated during shifting.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a hybrid powertrain which may improve shifting feeling by solving torque interruption, which is a disadvantage of an automated manual transmission (AMT), while utilizing advantages of the AMT by use of a motor, not only improve vehicle mountability but also reduce weight and cost with a reduction in an overall length of the transmission because a clutch between the motor and an engine conventionally required in the hybrid powertrain in which the motor is located between the engine and the transmission may be eliminated, and further contribute to improving fuel efficiency of a vehicle.

According to an exemplary embodiment of the present invention, a hybrid powertrain includes: an engine input shaft connected to an engine through a main clutch; a motor input shaft concentrically mounted with the engine input shaft and having a motor connected to the motor input; a center synchro mounted between the engine input shaft and the motor input shaft and configured to selectively intermit the engine input shaft and the motor input shaft; a first output shaft and a second output shaft each mounted in parallel to the engine input shaft; a plurality of external gear pairs mounted to form different gear ratios between the motor input shaft and the first output shaft, between the engine input shaft and the first output shaft, and between the engine input shaft and the second output shaft; and a cone clutch mounted between a first connection gear rotatably mounted on the motor input shaft to configure any one of the external gear pairs mounted between the motor input shaft and the first output shaft and the center synchro and driven by a sleeve of the center synchro to implement a continuous change of torque transmitted between the first connection gear and the motor input shaft.

The external gear pairs mounted between the motor input shaft and the first output shaft may include a first stage driving gear and a first stage driven gear for implementing a first stage, and a second stage driving gear and a second stage driven gear for implementing a second stage among a series of shifting stages, the first output shaft may be provided with a second connection gear engaged with the first connection gear, and a gear ratio formed by the first connection gear and the second connection gear may be smaller than a second stage gear ratio formed by the second stage driving gear and the second stage driven gear.

The first output shaft may be provided with a first clutch module having a synchronizer configured to selectively intermit the first stage driven gear to the first output shaft and a dog clutch configured to selectively intermit the second stage driven gear to the first output shaft which are provided on both sides thereof, respectively.

A first common gear and a second common gear which are commonly configured to implement two external gear pairs of the external gear pairs may be provided on the engine input shaft in a state in which rotation is intermitted, and the first common gear may be integrally provided with a clutch gear engaged with a sleeve of the center synchro.

The first common gear may be engaged with a sixth stage driven gear of the first output shaft to form the external gear pairs, and may be simultaneously engaged with a fourth stage driven gear of the second output shaft to form the external gear pairs.

The second common gear may be engaged with a fifth stage driven gear of the first output shaft to form the external gear pairs, and may be simultaneously engaged with a third stage driven gear of the second output shaft to form the external gear pairs.

A second clutch module having a synchronizer configured to selectively intermit the fifth stage driven gear to the first output shaft and a synchronizer configured to selectively intermit the sixth stage driven gear to the first output shaft which are provided on both sides thereof, respectively, may be provided between the fifth stage driven gear and the sixth stage driven gear of the first output shaft.

A third clutch module having a synchronizer configured to selectively intermit the third stage driven gear to the second output shaft and a synchronizer configured to selectively intermit the fourth stage driven gear to the second output shaft which are provided on both sides thereof, respectively, may be provided between the third stage driven gear and the fourth stage driven gear of the second output shaft.

The external gear pairs mounted between the motor input shaft and the first output shaft may be to implement two gear ratios having the largest gear ratios in sequence among a series of shifting stages to be implemented.

The motor may be mounted to transmit power to the motor input shaft through a reduction driving gear engaged with a first stage driving gear or a second stage driving gear of the motor input shaft.

A planetary gear that reduces power of the motor and transmits the reduced power to the motor input shaft may be provided between the motor and the motor input shaft.

According to various exemplary embodiments of the present invention, a hybrid powertrain includes: a first shifting module including a motor input shaft having a motor directly connected to the motor shaft and provided to form two shifting stages having the largest gear ratios in sequence among a series of shifting stages; a second shifting module including an engine input shaft concentrically mounted with the motor input shaft and connected to an engine through a main clutch, and provided to form the remaining shifting stages of the series of shifting stages; a center synchro mounted to intermit the motor input shaft and the engine input shaft; and a continuous variable device provided to implement a state in which the first shifting module forms a gear ratio smaller than a shifting stage having a small gear ratio among the shifting stages of the first shifting module by a continuously controlled friction force.

The continuous variable device may be configured so that the friction force is continuously controlled by a sleeve of the center synchro.

The first shifting module may include: a first output shaft mounted in parallel to the motor input shaft; a first stage driving gear mounted on the motor input shaft and a first stage driven gear mounted on the first output shaft to implement a first stage; a second stage driving gear mounted on the motor input shaft and a second stage driven gear mounted on the first output shaft to implement a second stage; and a first clutch module having a synchronizer configured to selectively intermit the first stage driven gear to the first output shaft and a dog clutch configured to selectively intermit the second stage driven gear to the first output shaft which are provided on both sides thereof, respectively.

The continuous variable device may include: a first connection gear rotatably mounted on the motor input shaft; a second connection gear mounted on the first output shaft such that rotation thereof is intermitted; and a cone clutch provided to be driven by the sleeve of the center synchro and implement a continuous change of torque transmitted between the first connection gear and the motor input shaft by the continuously controlled friction force.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5A, FIG. 5B, FIG. 5C, FIG. 6A, and FIG. 6B are views sequentially illustrating that the powertrain of FIG. 1 performs a power-on up-shift from the second stage to a third stage.

FIG. 7A, FIG. 7B, FIG. 7C, FIG. 8A and FIG. 8B are views sequentially illustrating that the powertrain of FIG. 1 performs a power-on up-shift from the third stage to a fourth stage.

FIG. 11A, FIG. 1B, FIG. 11C, FIG. 12A and FIG. 12B are views sequentially illustrating that the powertrain of FIG. 1 performs a power-on up-shift from the fifth stage to a sixth stage.

Figure 1:
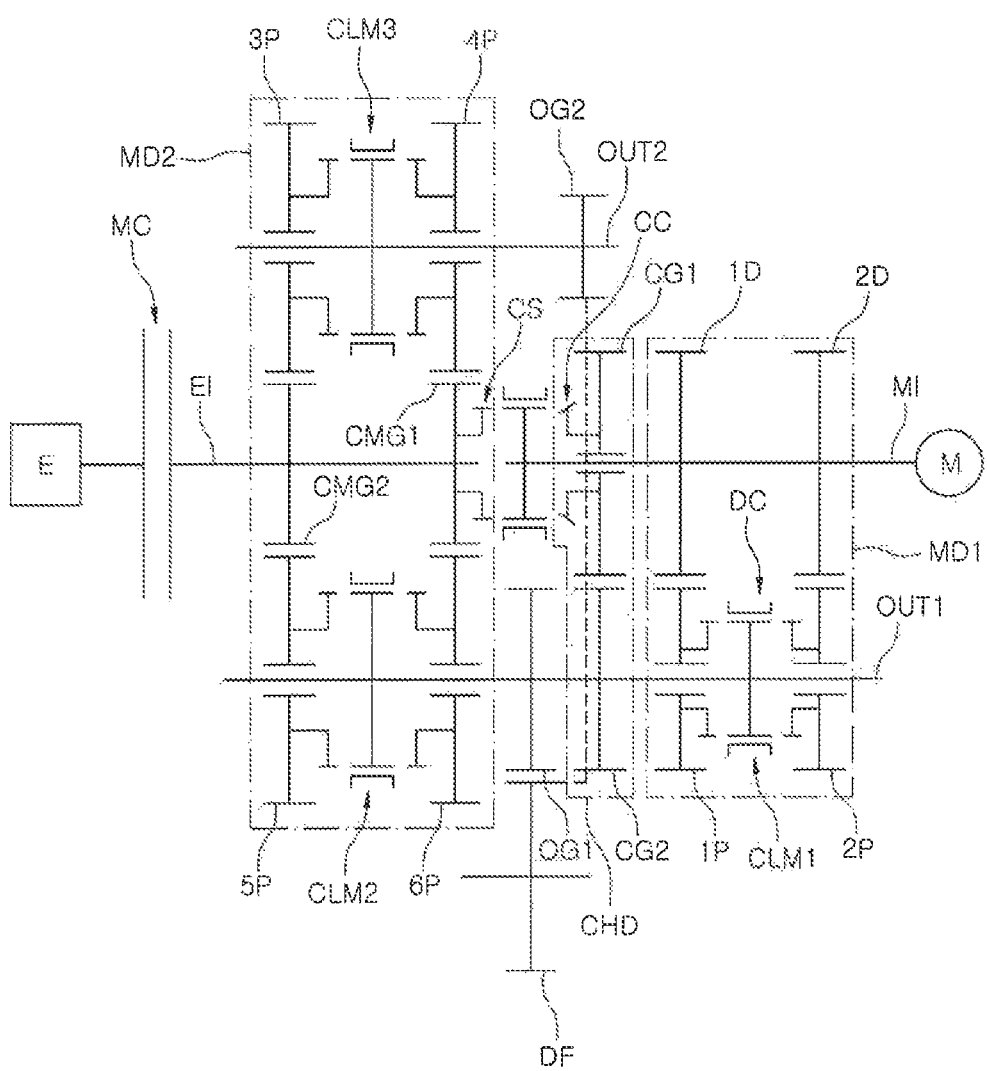
FIG. 1 is a view exemplarily illustrating a configuration of a hybrid powertrain according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Referring to FIG. 1, a hybrid powertrain according to an exemplary embodiment of the present invention is configured to include an engine input shaft EI connected to an engine E through a main clutch MC; a motor input shaft MI mounted to form a concentric shaft with the engine input shaft EI and having a motor M connected thereto; a center synchro CS mounted to intermit the engine input shaft EI and the motor input shaft MI; a first output shaft OUT1 and a second output shaft OUT2 mounted in parallel to the engine input shaft EI; a plurality of external gear pairs mounted to form different gear ratios between the motor input shaft MI and the first output shaft OUT1, between the engine input shaft EI and the first output shaft OUT1, and between the engine input shaft EI and the second output shaft OUT2; and a cone clutch CC mounted between a first connection gear CG1 rotatably mounted on the motor input shaft MI to configure any one of the external gear pairs mounted between the motor input shaft MI and the first output shaft OUT1 and the center synchro CS and driven by a sleeve of the center synchro CS to implement a continuous change of torque transmitted between the first connection gear CG and the motor input shaft MI.

That is, the exemplary embodiment of the present invention relates to a configuration in which a first shifting module MD1 on the right side and a second shifting module MD2 on the left side in the drawing may be connected to each other by the center synchro CS. The first output shaft OUT1 is configured to be commonly used in both the first shifting module MD1 and the second shifting module MD2 and output power to a differential DF through a first output gear OG1 and the second output shaft OUT2 is mounted to output power transmitted from the second shifting module MD2 to the differential DF through a second output gear OG2.

The first output shaft OUT1 is provided with a second connection gear CG2 engaged with the first connection gear CG1.

Therefore, the external gear pairs mounted between the motor input shaft MI and the first output shaft OUT1 include a first stage driving gear 1D and a first stage driven gear 1P for implementing a first stage; and a second stage driving gear 2D and a second stage driven gear 2P for implementing a second stage among a series of shifting stages; and a the first connection gear CG1 and the second connection gear CG2.

A gear ratio formed by the first connection gear CG1 and the second connection gear CG2 is slightly smaller than a second stage gear ratio formed by the second stage driving gear 2D and the second stage driven gear 2P. For example, the gear ratio formed by the first connection gear CG and the second connection gear CG2 is preferably smaller than the second stage gear ratio in the range of 0.01 to 0.05.

Furthermore, the first output shaft OUT1 is provided with a first clutch module CLM1 having a synchronizer configured for intermitting the first stage driven gear 1P to the first output shaft OUT1 and a dog clutch DC configured for intermitting the second stage driven gear 2P to the first output shaft OUT1 which are provided on both sides thereof, respectively.

If the gear ratio formed by the first connection gear CG1 and the second connection gear CG2 is slightly smaller than the second stage gear ratio formed by the second stage driving gear 2D and the second stage driven gear 2P, the dog clutch DC is smoothly released without requiring an impact or excessive operating force when the dog clutch DC is released while engaging the cone clutch CC for shifting to another shifting stage without torque interruption in a second stage driving state.

If the cone clutch CC is engaged, a transition from a state in which the torque is transmitted from the motor input shaft MI to the first output shaft OUT1 through the second stage driving gear 2D and the second stage driven gear 2P to a state in which the torque is transmitted through the first connection gear CG1 and the second connection gear CG2 may be made by a difference in the gear ratio as described above. In the instant case, if the dog clutch DC is released from the second stage driven gear 2P, the dog clutch DC is easily released.

Furthermore, the reason why the dog clutch DC is used as the device configured for intermitting the second stage driven gear 2P to the first output shaft OUT1 in the first clutch module CLM1 is as follows. In the case in which there is the difference in the gear ratio between the gear ratio formed by the first connection gear CG1 and the second connection gear CG2 and the second stage gear ratio, when the cone clutch CC is engaged and the shifting is performed from another shifting stage to the second stage while removing the torque interruption, a slight relative speed is generated between the sleeve of the first clutch module CLM1 and the second stage driven gear 2P by the difference in the gear ratio. With the capacity of a synchronizer ring forming the synchronizer, it is difficult to overcome and synchronize such relative speed, but rather the engagement between the sleeve and a clutch gear of the second stage driven gear 2P is impossible by the relative speed.

Therefore, the difference in the gear ratio is generated only in a very small range as described above and the slight relative speed is generated but is almost synchronized in the state in which the cone clutch CC is engaged. Accordingly, it is preferable to allow the sleeve of the first clutch module CLM1 to be engaged with the clutch gear of the second stage driven gear 2P as it is.

For reference, herein, the "synchronizer refers to an apparatus including the synchronizer ring mounted between the hub and the clutch gear to first synchronize the sleeve and the speed of the clutch gear when the sleeve sliding in a shaft direction with respect to the hub is engaged with the clutch gear integrally connected to a shifting stage gear for forming a shifting stage, and the "dog clutch" refers to an apparatus in which the synchronizer ring performing the synchronizing action is excluded from a configuration of the synchronizer as described above. These configurations are well known in the art.

In an exemplary embodiment of the present invention, a first common gear CMG1 and a second common gear CMG2 which are commonly configured to implement two external gear pairs of the external gear pairs are provided on the engine input shaft EI in a state in which rotation is intermitted, and the first common gear CMG1 is integrally provided with a clutch gear engaged with a sleeve of the center synchro CS.

Therefore, when the center synchro CS engages the sleeve with the clutch gear of the first common gear CMG1, the motor input shaft MI and the engine input shaft EI are connected to one.

The first common gear CMG1 is engaged with a sixth stage driven gear 6P of the first output shaft OUT1 to form the external gear pairs, and is simultaneously engaged with a fourth stage driven gear 4P of the second output shaft OUT2 to form the external gear pairs.

Furthermore, the second common gear CMG2 is engaged with a fifth stage driven gear 5P of the first output shaft OUT1 to form the external gear pairs, and is simultaneously engaged with a third stage driven gear 3P of the second output shaft OUT2 to form the external gear pairs.

Therefore, the external gear pairs required for shifting may be constituted by use of a relatively small number of gears.

A second clutch module CLM2 having a synchronizer configured for intermitting the fifth stage driven gear 5P to the first output shaft OUT1 and a synchronizer configured for intermitting the sixth stage driven gear 6P to the first output shaft OUT which are provided on both sides thereof, respectively, is provided between the fifth stage driven gear 5P and the sixth stage driven gear 6P of the first output shaft OUT1.

Therefore, a fifth stage or a sixth stage may be implemented by moving a sleeve of the second clutch module CLM2.

A third clutch module CLM3 having a synchronizer configured for intermitting the third stage driven gear 3P to the second output shaft OUT2 and a synchronizer configured for intermitting the fourth stage driven gear 4P to the second output shaft OUT2 which are provided on both sides thereof, respectively, is provided between the third stage driven gear 3P and the fourth stage driven gear 4P of the second output shaft OUT2.

Therefore, a third stage or a fourth stage may be implemented by moving a sleeve of the third clutch module CLM3.

Meanwhile, the external gear pairs mounted between the motor input shaft MI and the first output shaft OUT1 are to implement two gear ratios having the largest gear ratios in sequence among a series of shifting stages to be implemented.

That is, the external gear pairs mounted between the motor input shaft MI and the first output shaft OUT1 are to implement a first stage gear ratio and a second stage gear ratio.

The present invention as described above may be expressed as follows.

That is, the hybrid powertrain according to an exemplary embodiment of the present invention is configured to include a first shifting module MD1 including a motor input shaft MI having a motor M directly connected thereto and provided to form two shifting stages having the largest gear ratios in sequence among a series of shifting stages; a second shifting module MD2 including an engine input shaft EI forming a concentric shaft with the motor input shaft MI and connected to an engine E through a main clutch MC, and provided to form the remaining shifting stages of the series of shifting stages; a center synchro CS mounted to intermit the motor input shaft MI and the engine input shaft EI; and a continuous variable device provided to implement a state in which the first shifting module MD1 forms a gear ratio smaller than a shifting stage having a small gear ratio among the shifting stages of the first shifting module MD1 by a continuously controlled friction force.

Here, the continuous variable device CHD is configured so that the friction force is continuously controlled by a sleeve of the center synchro CS.

Meanwhile, the first shifting module MD1 is configured to include a first output shaft OUT1 mounted in parallel to the motor input shaft MI; a first stage driving gear 1D mounted on the motor input shaft MT and a first stage driven gear 1P mounted on the first output shaft OUT1 to implement a first stage; a second stage driving gear 2D mounted on the motor input shaft MI and a second stage driven gear 2P mounted on the first output shaft OUT1 to implement a second stage; and a first clutch module CLM1 having a synchronizer configured for intermitting the first stage driven gear 1P to the first output shaft OUT1 and a dog clutch DC configured for intermitting the second stage driven gear 2P to the first output shaft OUT1 which are provided on both sides thereof, respectively.

Here, the continuous various devices CHD is configured to include a first connection gear CG1 rotatably mounted on the motor input shaft MI; a second connection gear CG2 mounted on the first output shaft OUT1 such that rotation thereof is intermitted; and a cone clutch CC provided to be driven by the sleeve of the center synchro CS and implement a continuous change of torque transmitted between the first connection gear CG1 and the motor input shaft MI by the continuously controlled friction force.

Figure 22:
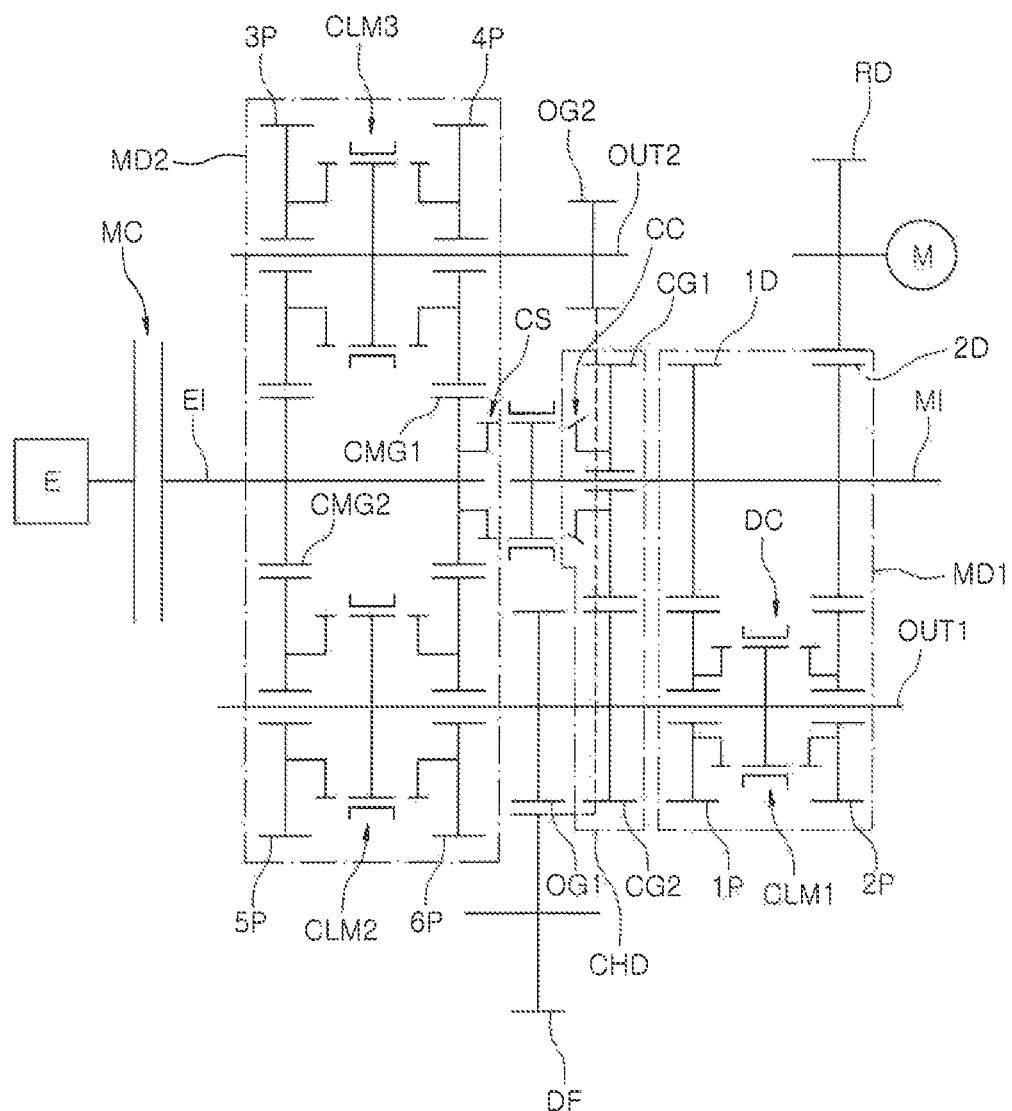
FIG. 22 is a view exemplarily illustrating various exemplary embodiments of the present invention.

Meanwhile, FIG. 22 illustrates various exemplary embodiments of the hybrid powertrain according to an exemplary embodiment of the present invention. Here, other configurations are the same as those of FIG. 1 and the various exemplary embodiments has a configuration in which the motor M is mounted to transmit power to the motor input shaft MI through a reduction driving gear (RD) engaged with a second stage driving gear 2D of the motor input shaft MI.

The reduction driving gear RD may also be mounted to be engaged with a first stage driving gear 1D.

Figure 23:
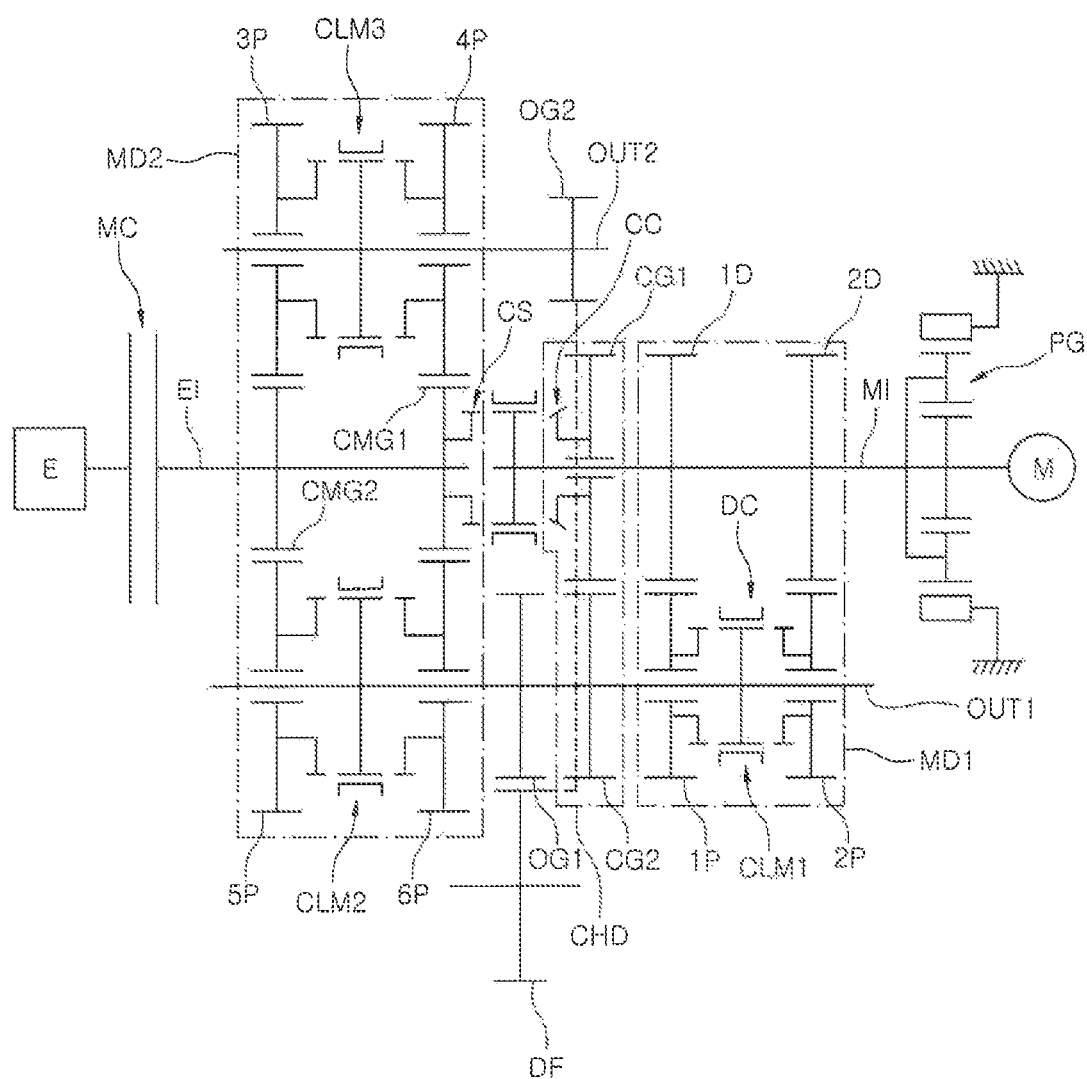
FIG. 23 is a view exemplarily illustrating various exemplary embodiments of the present invention.

FIG. 23 illustrates various exemplary embodiments of the hybrid powertrain according to an exemplary embodiment of the present invention. Here, other configurations are the same as those of FIG. 1 and the various exemplary embodiments has a configuration in which a planetary gear PG that reduces the power of the motor M and transmits the reduced power to the motor input shaft MI is provided between the motor M and the motor input shaft MI.

In both the exemplary embodiments in FIGS. 22 and 23 of the present invention, the power of the motor M is reduced and provided to the motor input shaft MI, whereby the capacity of the motor M may be relatively reduced.

FIG. 2, FIG. 3 and FIG. 4 are views sequentially illustrating that the powertrain of FIG. 1 performs a power-on up-shift from a first stage to a second stage. Such processes will be described.

For reference, portions where the power acts are indicated by a thick line.

Figure 2A:
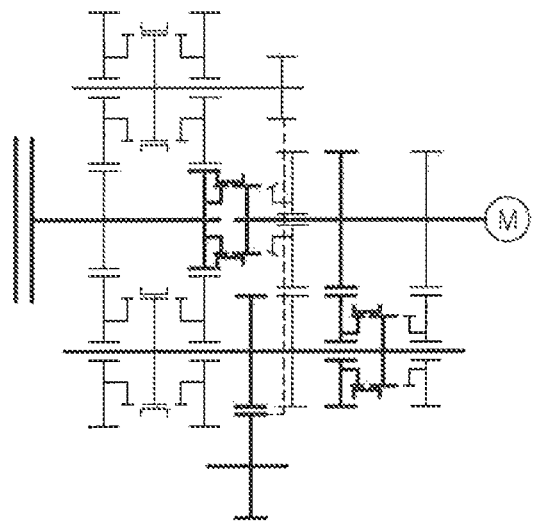
FIG. 2A, FIG. 2B, FIG. 2C, FIG. 3A, FIG. 3B, FIG. 3C, FIG. 4A and FIG. 4B are views sequentially illustrating that the powertrain of FIG. 1 performs a power-on up-shift from a first stage to a second stage.

FIG. 2A illustrates a state in which power of the motor input shaft MI is transmitted to the first output shaft OUT1 through the first stage driving gear 1D and the first stage driven gear 1P and is drawn to a differential DF through a first output gear OG1, because power of the engine drives the motor input shaft MI together through the center synchro CS as well as the engine input shaft EI and the synchronizer of the first clutch unit forms the first stage.

Figure 2B:
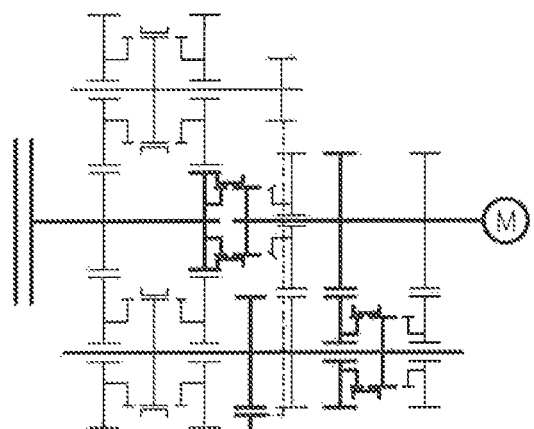

FIG. 2B illustrates a state of driving the motor M together, when a shifting command from the state A to the second stage occurs.

Figure 2C:
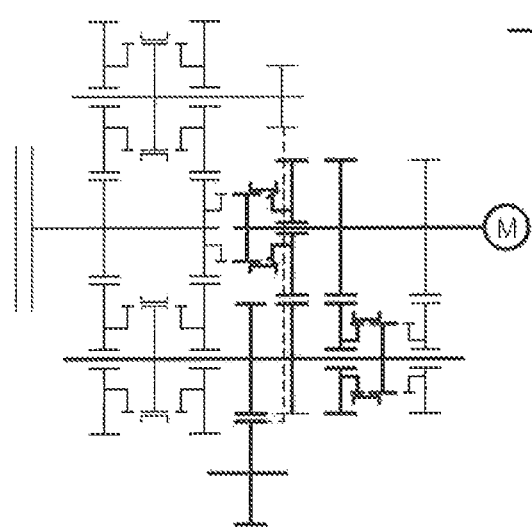

FIG. 2C illustrates a state of releasing the main clutch MC and engaging the cone clutch CC while continuing to perform a first stage driving by the motor M. Since the sleeve of the center synch CS operates the cone clutch CC, the center synch CS is naturally released to separate the engine input shaft EI and the motor input shaft MI.

Figure 3A:
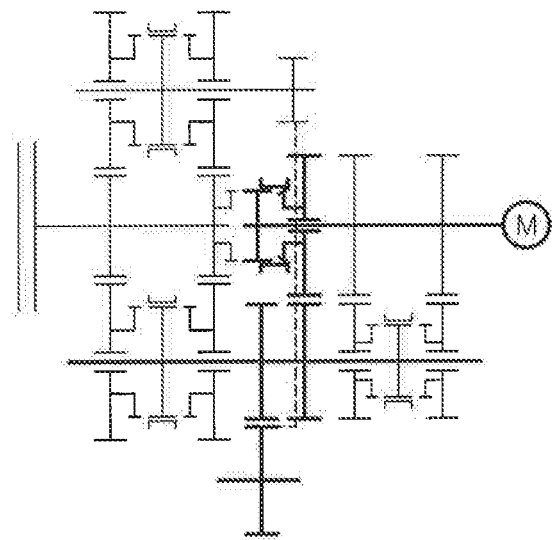

FIG. 3A illustrates a state in which the synchronizer of the first clutch unit releases the first stage. Here, the power is continuously transmitted to the first output shaft OUT1 through the cone clutch CC, the first connection gear CG1, and the second connection gear CG2, preventing torque interruption.

Figure 3B:
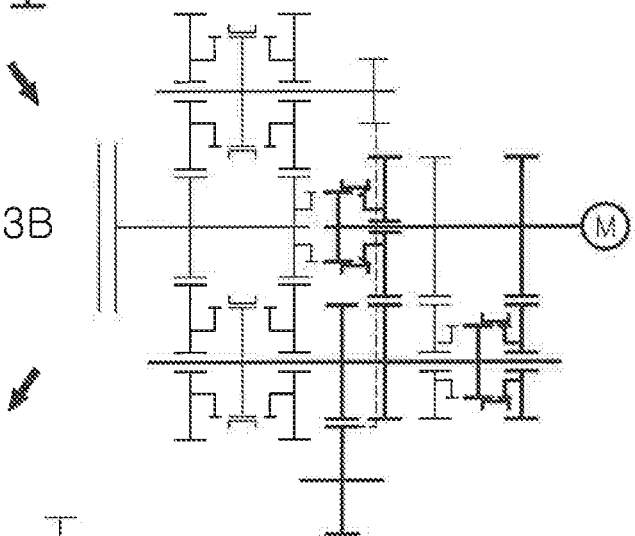

FIG. 3B illustrates an engagement of the dog clutch DC of the first clutch unit. As described above, in the state D in which the power is transmitted by the cone clutch CC, since a slight relative speed due to the difference in the gear ratio between the gear ratio of the first connection gear CG1 and the second connection gear CG2 and the second stage gear ratio is generated between the second stage driven gear 2P and the sleeve of the first clutch unit, the sleeve of the first clutch unit is engaged with a clutch gear of the second stage driven gear 2P by use of the dog clutch DC without having the synchronizer ring.

Figure 3C:
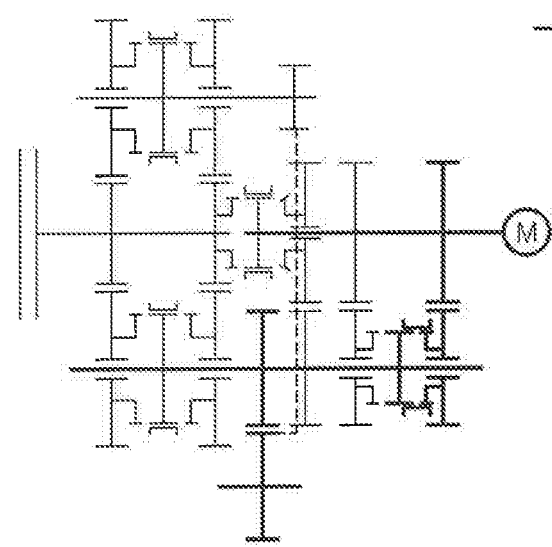

FIG. 3C illustrates a state in which the cone clutch CC is released and a two-speed driving is performed by the motor M.

Figure 4A:
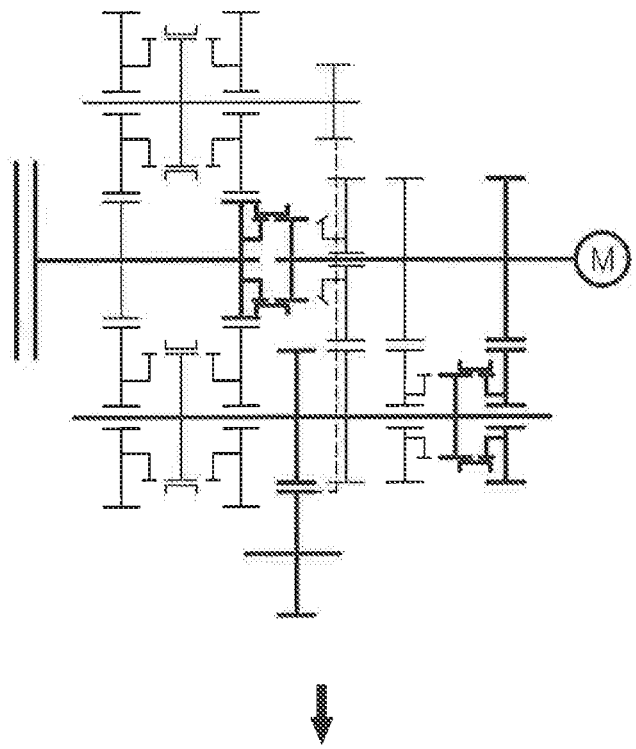

FIG. 4A illustrates a state in which the center synchro CS is engaged to connect the engine input shaft EI and the motor input shaft M1 and the main clutch MC is then engaged to transmit both the power of the engine and the power of the motor M to the first output shaft OUT1, performing the two-speed driving.

Figure 4B:
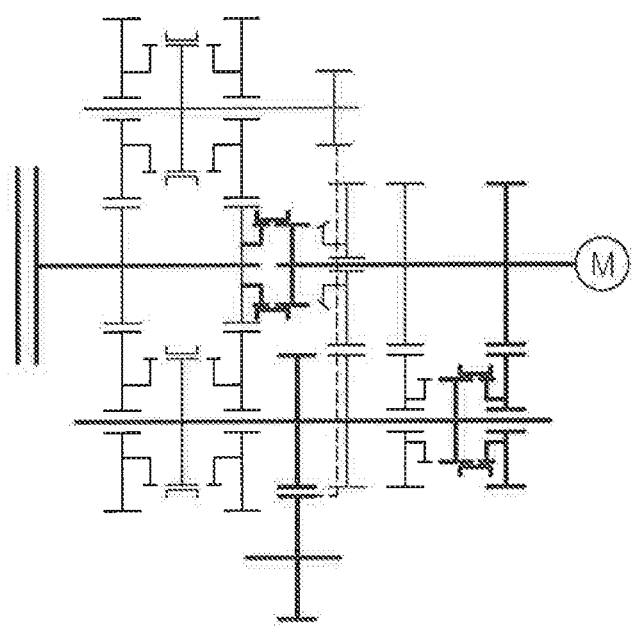

FIG. 4B illustrates a state in which the motor M does not generate the power in the state G so that the two-speed driving by the engine is performed.

FIG. 5 and FIG. 6 are views sequentially illustrating that the powertrain of FIG. 1 performs a power-on up-shift from the second stage to a third stage. Such processes will be described.

FIG. 5A illustrates a state in which the two-speed driving is performed by the engine. The in the instant state, when a shifting command to a three-speed occurs, a two-speed driving state is formed while driving the motor M together as in FIG. 5B.

FIG. 5C illustrates a state in which the engine input shaft EI is separated from the motor input shaft MI by releasing the main clutch MC and the center synchro CS. Here, the two-speed driving state is still formed by the motor M of the vehicle.

FIG. 6A illustrates a situation in which a three-speed driving is performed by the engine by connecting a third driven gear to the second output shaft OUT2 by a synchronizer of the third clutch module CLM3 and coupling the main clutch MC, and the power of the motor M is also transmitted to the differential DF.

FIG. 6B illustrates a case in which the three-speed driving state is formed by only the engine by releasing the power of the motor M in the state of (D).

As described above, even when the shifting from the second stage to the third stage is performed, the torque interruption does not occur.

FIG. 7 and FIG. 8 are views sequentially illustrating that the powertrain of FIG. 1 performs a power-on up-shift from the third stage to a fourth stage. Hereinafter, this is will be described.

Figure 7A:
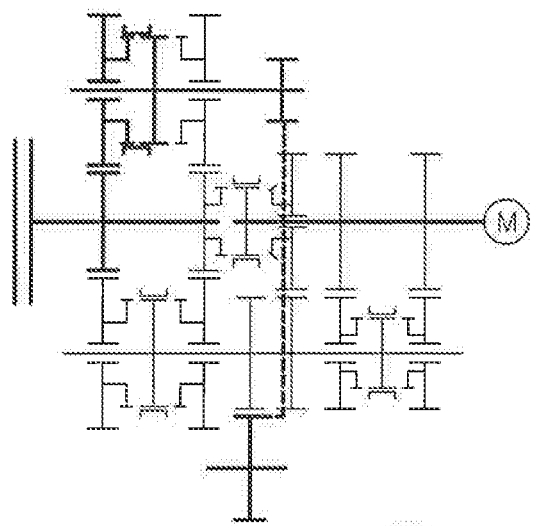
Figure 7B:
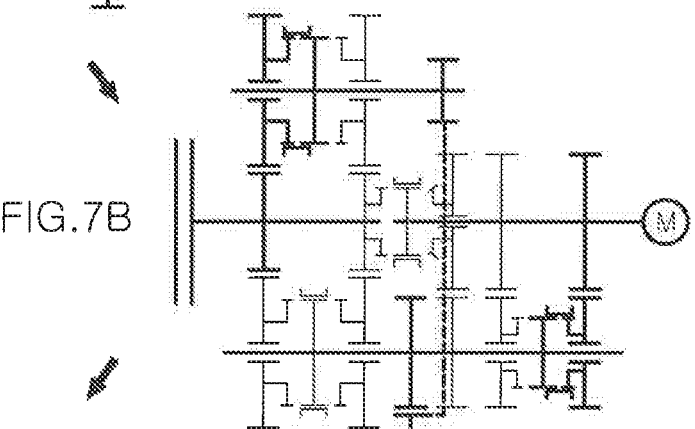

A state in FIG. 7A is a state in which the three-speed driving is performed by only the power of the engine. When a shifting command to a fourth stage occurs, the motor M is driven as in FIG. 7B to allow the power of the motor M to be transmitted to the differential DF.

Figure 7C:
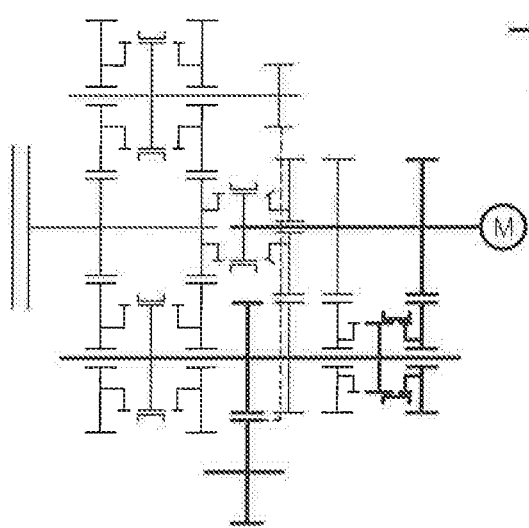

FIG. 7C illustrates a state in which the three-speed driving is performed by only the motor M by releasing the main clutch MC.

FIG. 8A illustrates a situation in which a four-speed driving is performed by the engine by connecting a fourth driven gear to the second output shaft OUT2 by a synchronizer of the third clutch module CLM3 and coupling the main clutch MC, and the power of the motor M is also transmitted to the differential DF.

FIG. 8B illustrates a case in which the four-speed driving state is formed by only the engine by releasing the power of the motor M in the state of (D).

As described above, the torque interruption does not occur even in the present shifting process. The reason is that while the motor M transmits power through the second driving gear and the second driven gear, the main clutch MC is released and the third clutch module CLM3 may be switched to connect the fourth stage driven gear 4P to the second output shaft OUT2 instead of the third stage driven gear 3P.

In the instant case, a speed of the motor M is adjusted according to the speed of each shifting stage.

Figure 9A:
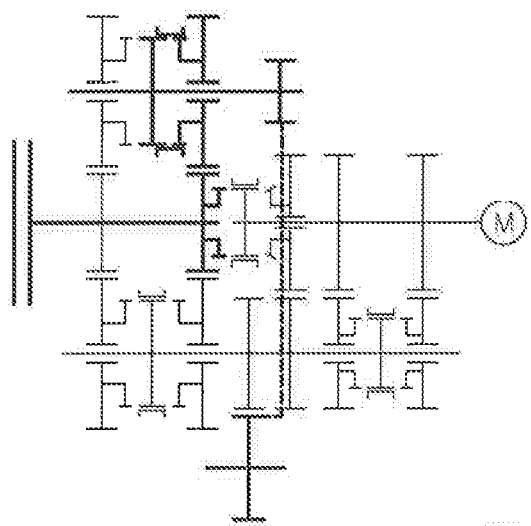
FIG. 9A, FIG. 9B, FIG. 9C, FIG. 10A and FIG. 10B are views sequentially illustrating that the powertrain of FIG. 1 performs a power-on up-shift from the fourth stage to a fifth stage.
Figure 9B:
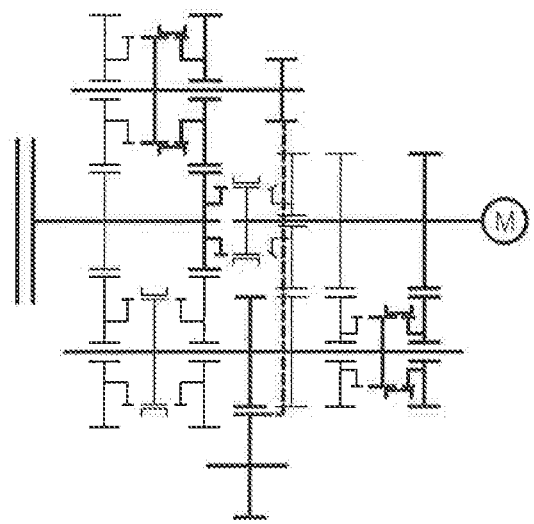
Figure 9C:
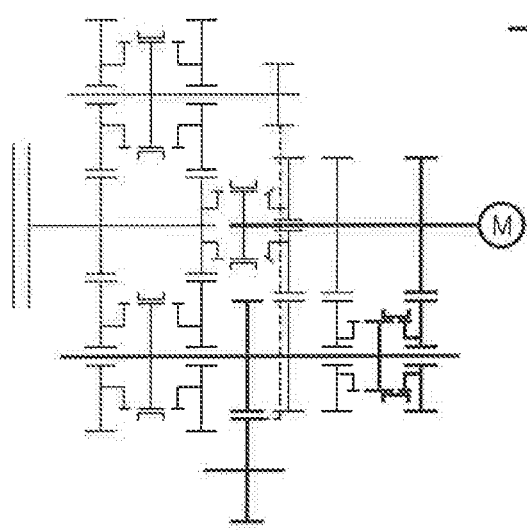
Figure 10A:
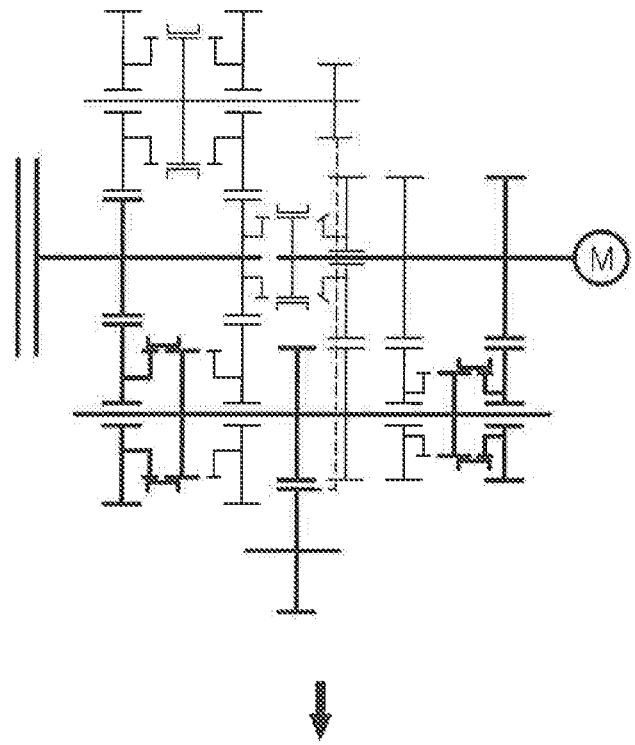
Figure 10B:
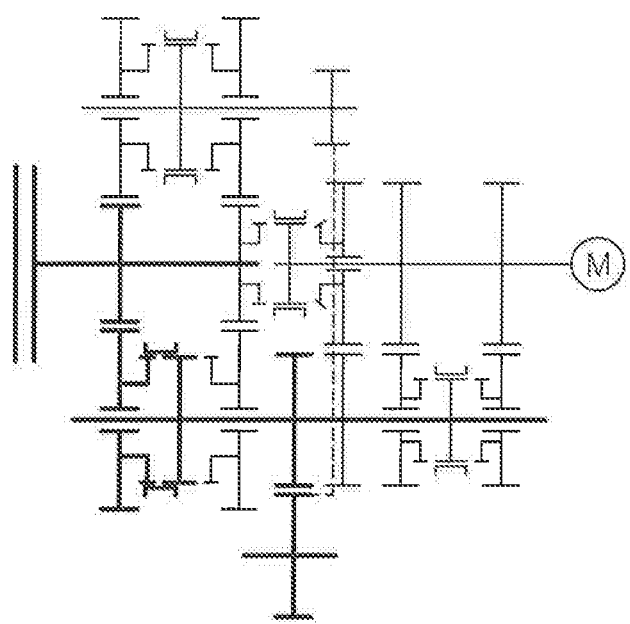

FIG. 9 and FIG. 10 are views sequentially illustrating that the powertrain of FIG. 1 performs a power-on up-shift from the fourth stage to a fifth stage. Here, the only difference is that the fourth stage is released by the synchronizer of the third clutch module CLM3 and the fifth stage is engaged by the synchronizer of the second clutch module CLM2, and the rest is the same as the shifting from the third stage to the fourth stage. Therefore, a detailed description is omitted.

Figure 11A:
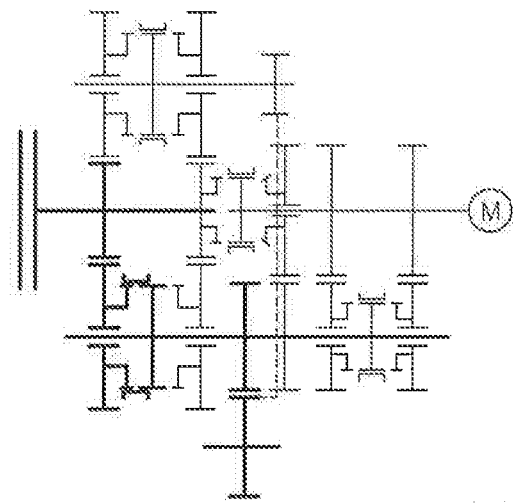
Figure 11B:
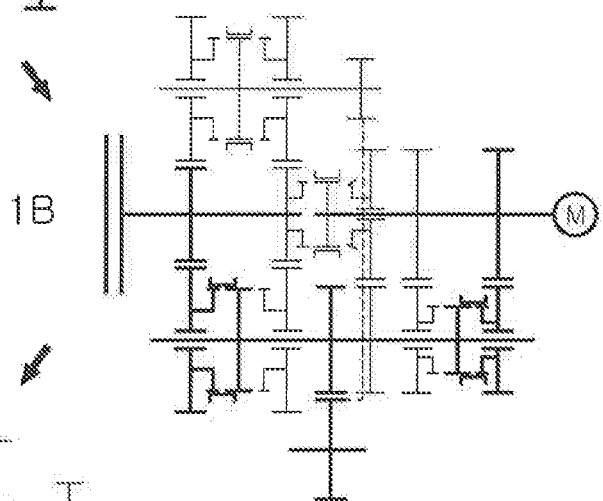
Figure 11C:
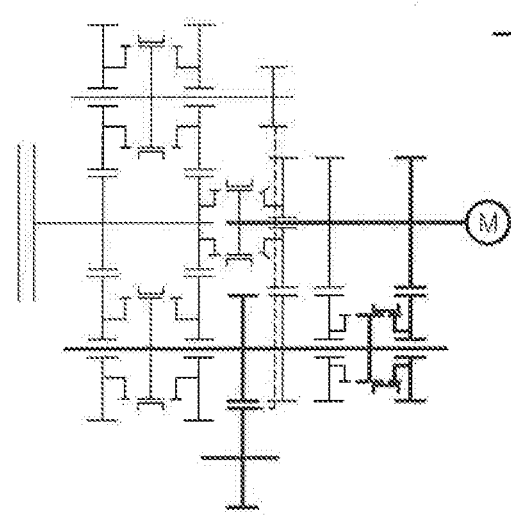

FIG. 11 and FIG. 12 are views sequentially illustrating that the powertrain of FIG. 1 performs a power-on up-shift from the fifth stage to a sixth stage. Here, the only difference is that the fifth stage is released and the sixth stage is engaged by the synchronizer of the second clutch module CLM2, and the rest is the same as the shifting from the third stage to the fourth stage. Therefore, a detailed description is omitted.

FIG. 13 and FIG. 14 are views sequentially illustrating that the powertrain of FIG. 1 performs a power-on down-shift from the third stage to the second stage. This will be described.

Figure 13A:
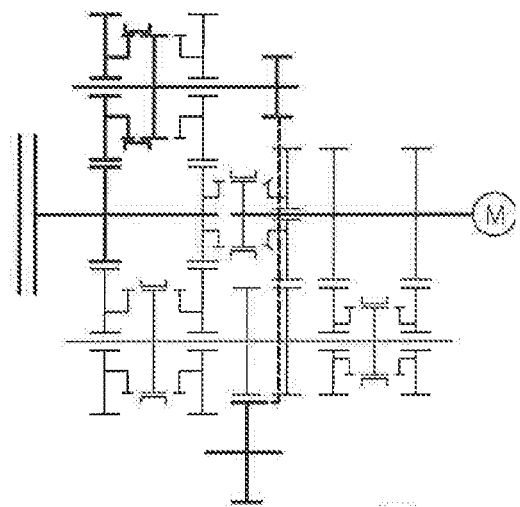
FIG. 13A, FIG. 13B, FIG. 13C, FIG. 14A and FIG. 14B are views sequentially illustrating that the powertrain of FIG. 1 performs a power-on down-shift from the third stage to the second stage.
Figure 13B:
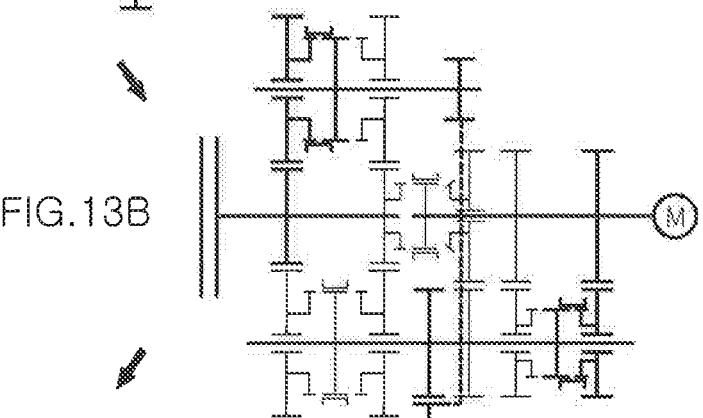

FIG. 13A illustrates a three-speed driving state by the engine. When a shifting command to a two-speed occurs, the motor M is driven as in FIG. 13B so that the three-speed power is also provided to the first output shaft OUT1 by the motor M.

Figure 13C:
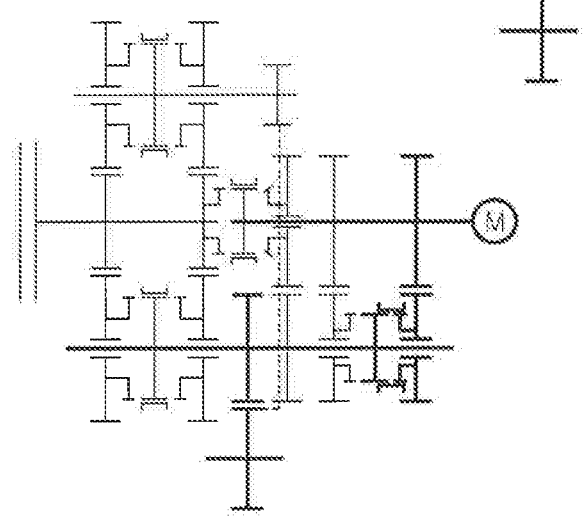

FIG. 13C illustrates a state in which the vehicle is driven by only the motor M by releasing the main clutch MC and releasing the synchronizer of the third clutch module CLM3 to neutral. Here, the vehicle is driven in the two-speed state by adjusting the speed of the motor M.

Figure 14A:
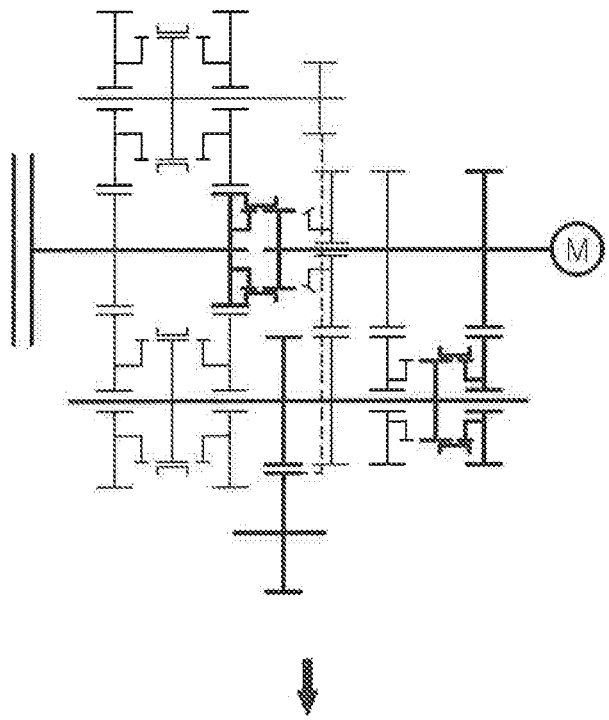

FIG. 14A illustrates a state in which the power of the engine is also transmitted to the differential DF through the first output shaft OUT1 by engaging the center synchro CS and then coupling the main clutch MC.

Figure 14B:
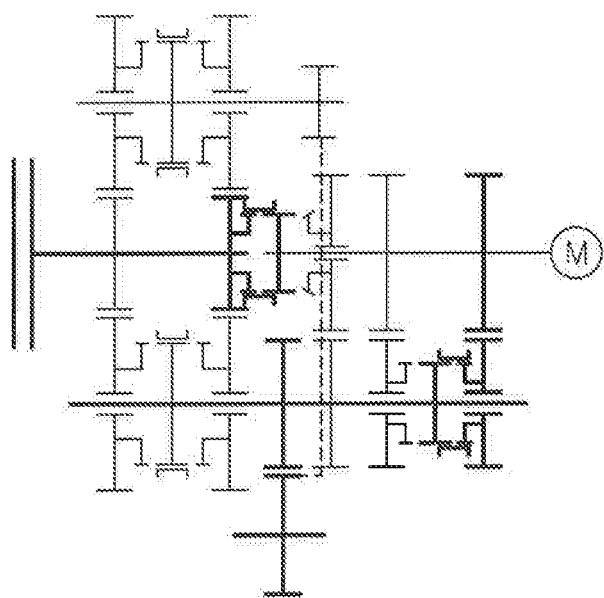

FIG. 14B illustrates a state in which the two-speed driving state is implemented by only the engine by releasing the power of the motor M.

As described above, the torque interruption does not occur even in the above-described shifting process.

FIG. 15, FIG. 16 and FIG. 17 are views sequentially illustrating that the powertrain of FIG. 1 performs a power-on down-shift from the second stage to the first stage. This will be described.

Figure 15A:
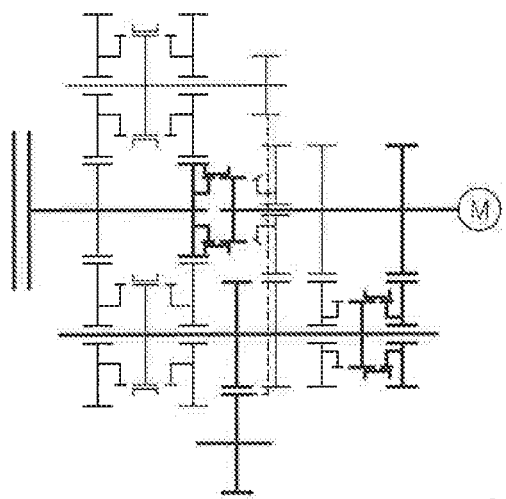
FIG. 15A, FIG. 15B, FIG. 15C, FIG. 16A, FIG. 16B, FIG. 17A and FIG. 17B are views sequentially illustrating that the powertrain of FIG. 1 performs a power-on down-shift from the second stage to the first stage.
Figure 15B:
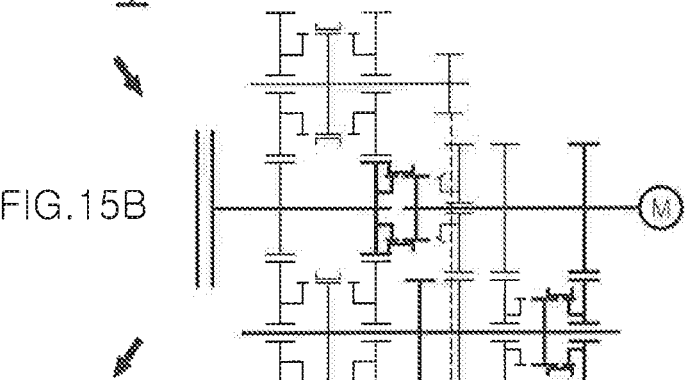

FIG. 15A illustrates the two-speed driving state by the engine. When a shifting command to one-speed occurs, the motor M is driven as in FIG. 15B so that the one-speed is implemented by the engine and the motor M.

Figure 15C:
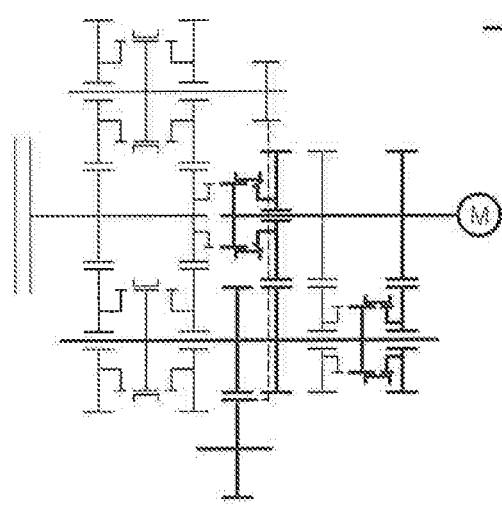

FIG. 15C illustrates a state in which a friction of the cone clutch CC occurs after the main clutch MC is released and the center synchro CS is released. As described above, since the gear ratio of the first connection gear CG1 and the second connection gear CG2 is configured to be slightly smaller than the second stage gear ratio, the state is changed from the state in which the power of the motor M is transmitted to the first output shaft OUT1 through the second stage driving gear 2D and the second stage driven gear 2P to the state in which the power of the motor M is transmitted through the first connection gear CG1 and the second connection gear CG2 when the cone clutch CC is coupled. As a result, the dog clutch DC may be easily released from the second stage driven gear 2P.

Figure 16A:
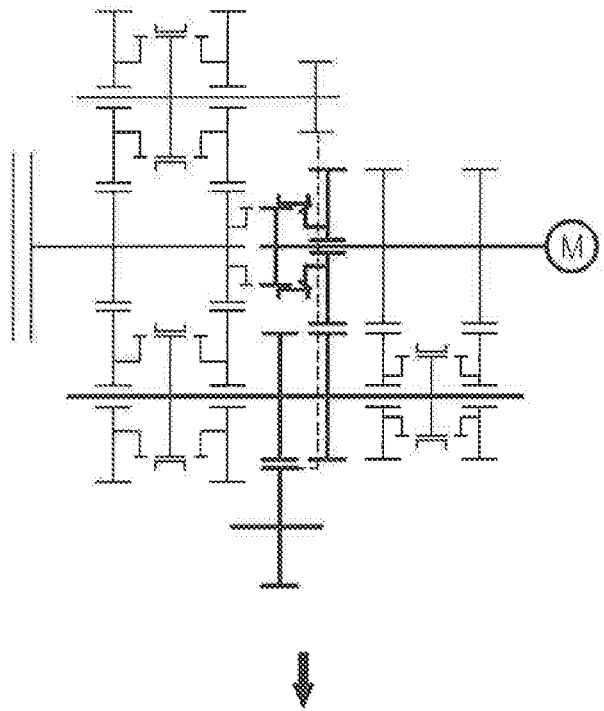

FIG. 16A illustrates a state in which the dog clutch DC of the first clutch module CLM1 is released as described above.

If the gear ratio of the first connection gear CG1 and the second connection gear CG2 is the same as the second stage gear ratio or is set to be greater than the second stage gear ratio, the release of the dog clutch DC is not easy and an impact or noise occurs even though the dog clutch DC is released, because the state in which the power is still transmitted through the second stage driven gear 2P is maintained even when the cone clutch CC is engaged as described above.

Figure 16B:
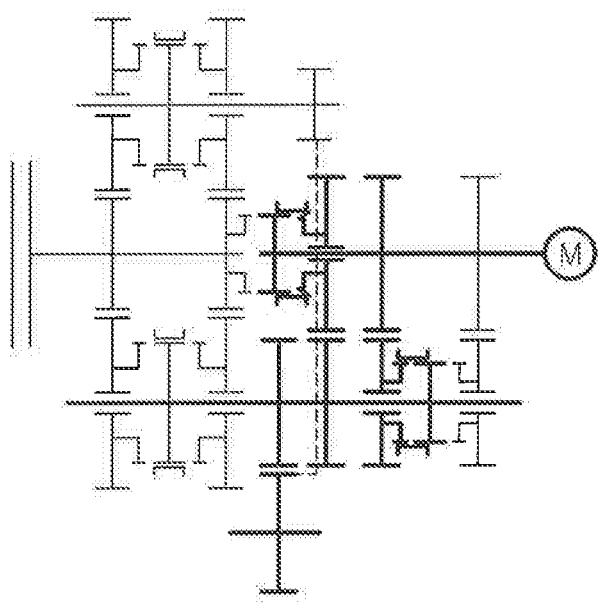

FIG. 16B illustrates a state in which the speed of the motor M is adjusted to one-speed and the first stage driven gear 1P is connected to the first output shaft OUT1 by the synchronizer of the first clutch module CLM1.

Figure 17A:
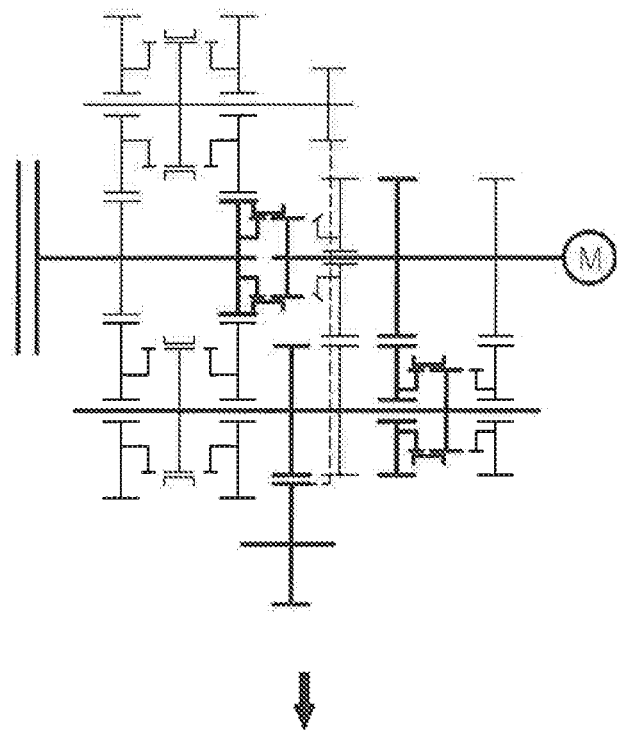

FIG. 17A illustrates a state in which the power of the engine is supplied to the first output shaft OUT1 through the first stage driving gear 1D and the first stage driven gear 1P by releasing the cone clutch CC, engaging the center synchro CS, and then engaging the main clutch MC.

Figure 17B:
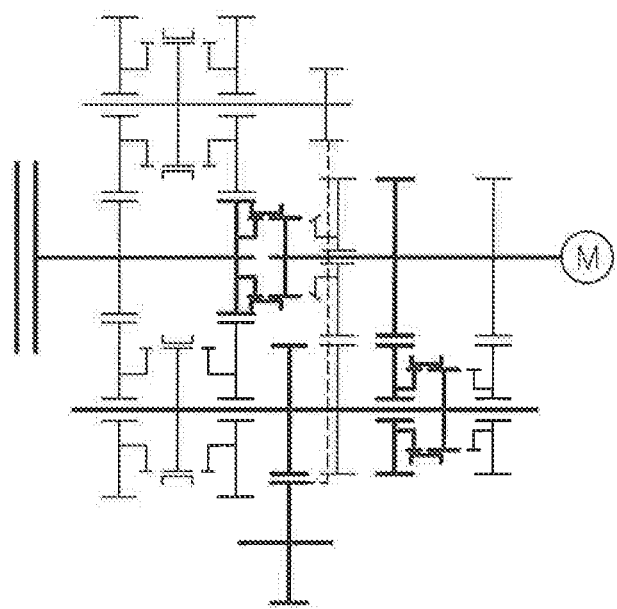

FIG. 17B illustrates a case in which one-speed driving state is formed by only the engine by releasing the power of the motor M. Here, the shifting is completed without the torque interruption.

FIG. 18 and FIG. 19 are views sequentially illustrating that the powertrain of FIG. 1 performs a power-on up-shift from a first stage to a second stage in an electric vehicle mode. This will be described.

Figure 18A:
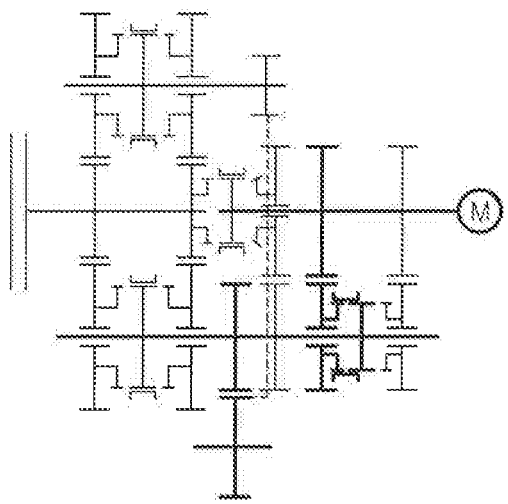
FIG. 18A, FIG. 18B, FIG. 18C, FIG. 19A and FIG. 19B are views sequentially illustrating that the powertrain of FIG. 1 performs a power-on up-shift from a first stage to a second stage in an electric vehicle mode.
Figure 18B:
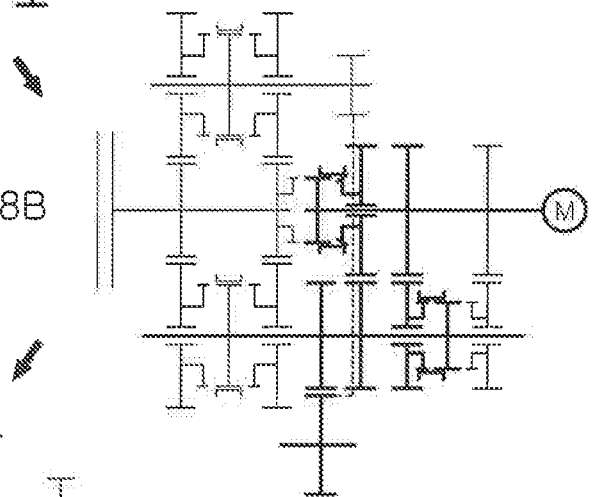
Figure 18C:
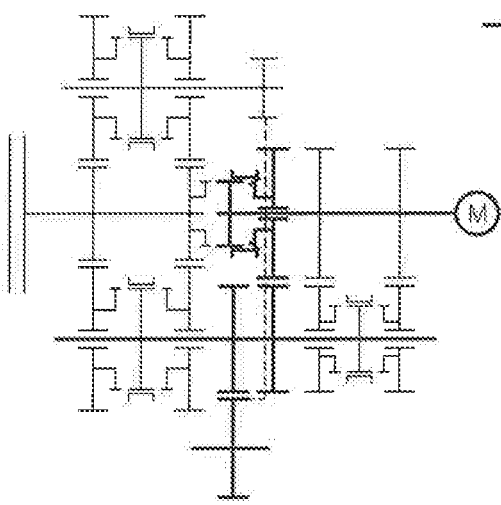

In a first stage driving state of an electric vehicle mode by only the motor M as in FIG. 18A, when a shifting command to a second stage occurs, a friction force of the cone clutch CC occurs as in FIG. 18B and the synchronizer of the first clutch module CLM1 is released as in FIG. 18C, releasing a connection state between the first stage driven gear 1P and the first output shaft OUT1.

Figure 19A:
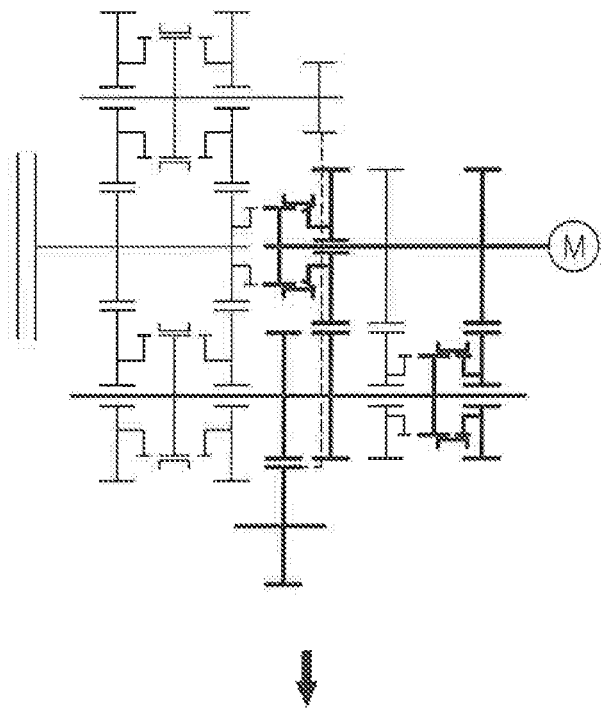

FIG. 19A illustrates a state in which the second state driven gear 2P is connected to the first output shaft OUT1 by moving the sleeve of the first clutch module CLM1 to engage the dog clutch DC.

Figure 19B:
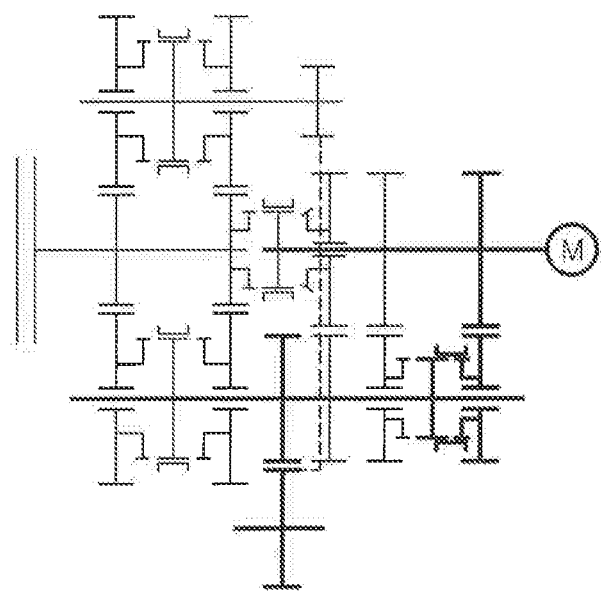

FIG. 19B illustrates a state in which the power of the motor M is transmitted to the first output shaft OUT1 by only the second stage driving gear 2D and the second stage driven gear 2P by releasing the cone clutch CC such that a two-speed driving of the electric vehicle mode is performed.

It may also be seen that the torque interruption does not occur in such a shifting process.

Figure 20A:
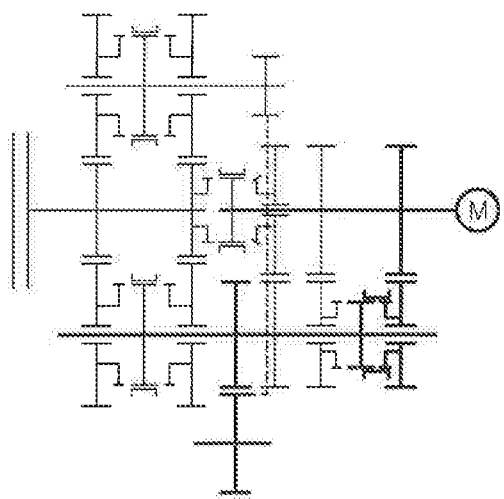
FIG. 20A, FIG. 20B, FIG. 20C, FIG. 21A and FIG. 21B are views sequentially illustrating that the powertrain of FIG. 1 performs a power-on down-shift from the second stage to the first stage in the electric vehicle mode.
Figure 20B:
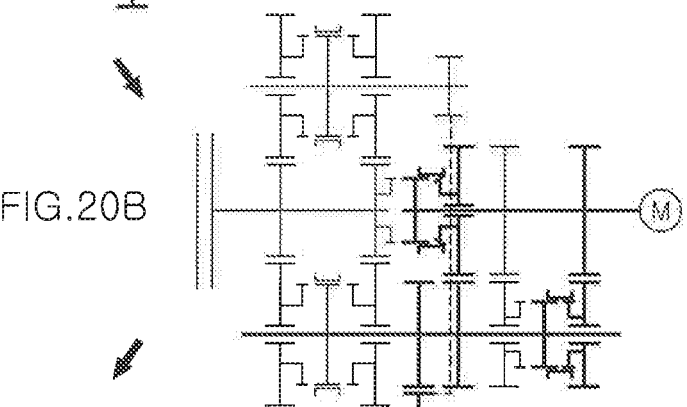
Figure 20C:
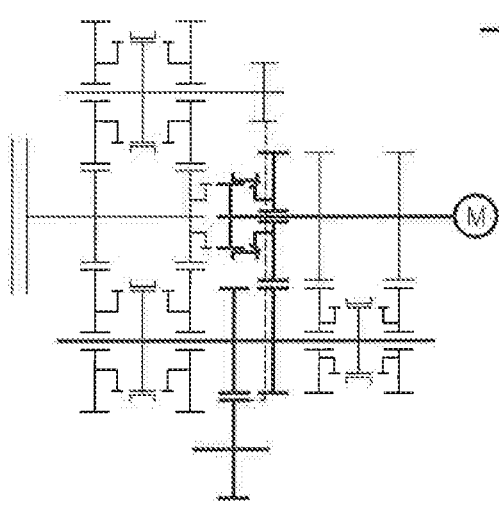
Figure 21A:
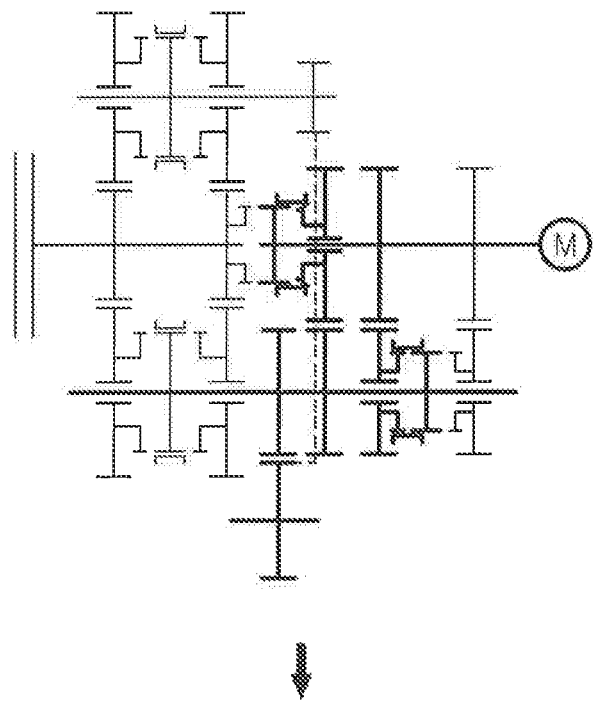
Figure 21B:
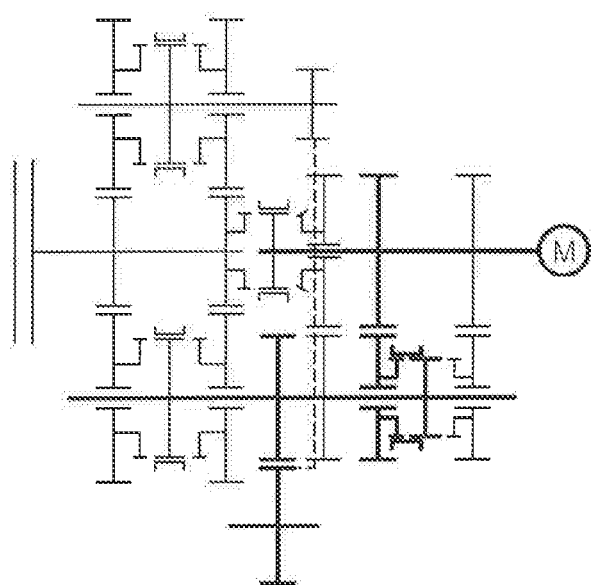

FIG. 20 and FIG. 21 are views sequentially illustrating that the powertrain of FIG. 1 performs a power-on downshift from the second stage to the first stage in the electric vehicle mode. This will be described.

In a second stage driving state of the electric vehicle mode by only the motor M as in FIG. 20A, when a shifting command to the first stage occurs, a friction force of the cone clutch CC occurs as in FIG. 20B and the dog clutch DC is released as in FIG. 20C.

FIG. 21A illustrates a state in which the first stage driven gear 1P is connected to the first output shaft OUT1 by adjusting the speed of the motor M to one-speed and then engaging the synchronizer of the first clutch module CLM1.

FIG. 20B illustrates a state in which the power of the motor M is transmitted to the first output shaft OUT1 through only the first stage driving gear 1D and the first stage driven gear 1P by releasing the cone clutch CC to thereby form one-speed. It may also be seen that the shifting is completed without the torque interruption.

According to an exemplary embodiment of the present invention as described above, a shifting feeling may be improved by solving the torque interruption, which is a disadvantage of the AMT, while utilizing advantages such as cost, material cost, and fuel efficiency of the AMT by use of the motor M, the vehicle mountability may not only be improved but also the weight and cost may be reduced with the reduction in the overall length of the transmission because the clutch between the motor and the engine conventionally required in the hybrid powertrain in which the motor M is located between the engine and the transmission may be eliminated.

According to an exemplary embodiment of the present invention, the shifting feeling may be improved by solving the torque interruption, which is a disadvantage of the AMT, while utilizing advantages of the AMT by use of the motor, the vehicle mountability may not only be improved but also the weight and cost may be reduced with the reduction in the overall length of the transmission because the clutch between the motor and the engine conventionally required in the hybrid powertrain in which the motor is located between the engine and the transmission may be eliminated, and it is possible to further contribute to improving the fuel efficiency of the vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A powertrain apparatus comprising:
   an engine input shaft connected to an engine through a main clutch;
   a motor input shaft concentrically mounted with the engine input shaft and having a motor connected to the motor input;
   a center synchro mounted between the engine input shaft and the motor input shaft and configured to selectively intermit the engine input shaft and the motor input shaft;
   a first output shaft and a second output shaft each mounted in parallel to the engine input shaft;
   a plurality of gear pairs mounted to form different gear ratios between the motor input shaft and the first output shaft, between the engine input shaft and the first output shaft, and between the engine input shaft and the second output shaft; and
   a cone clutch mounted between a first connection gear rotatably mounted on the motor input shaft to configure one of the plurality of gear pairs mounted between the motor input shaft and the first output shaft, and the center synchro and driven by a sleeve of the center synchro to implement a continuous change of torque transmitted between the first connection gear and the motor input shaft.

2. The powertrain apparatus of claim 1,
   wherein the plurality of gear pairs mounted between the motor input shaft and the first output shaft include a first stage driving gear and a first stage driven gear for implementing a first stage, and a second stage driving gear and a second stage driven gear for implementing a second stage among a series of shifting stages, wherein the first output shaft is mounted with a second connection gear gear-meshed with the first connection gear, and wherein a gear ratio formed by the first connection gear and the second connection gear is smaller than a second stage gear ratio formed by the second stage driving gear and the second stage driven gear.

3. The powertrain apparatus of claim 2, wherein the first stage driving gear is fixedly mounted to the motor input shaft and the first stage driven gear is rotatably mounted to the first output shaft, wherein the second stage driving gear is fixedly mounted to the motor input shaft and the second stage driven gear is rotatably mounted to the first output shaft, wherein the second connection gear is fixedly mounted to the first output shaft.

4. The powertrain apparatus of claim 2, wherein the first output shaft is mounted with a first clutch module having:

a synchronizer configured to selectively intermit the first stage driven gear to the first output shaft; and a dog clutch configured to selectively intermit the second stage driven gear to the first output shaft.

5. The powertrain apparatus of claim 4, wherein a first common gear and a second common gear which are commonly configured to implement two gear pairs of the plurality of gear pairs, are mounted on the engine input shaft in a state in which rotation is intermitted, and wherein the first common gear is integrally mounted with a clutch gear engaged with a sleeve of the center synchro.

6. The powertrain apparatus of claim 5, wherein the first common gear is gear-meshed with a sixth stage driven gear of the first output shaft to form the plurality of gear pairs, and is gear-meshed with a fourth stage driven gear of the second output shaft to form the plurality of gear pairs.

7. The powertrain apparatus of claim 6, wherein the sixth stage driven gear is rotatably mounted on the first output shaft and the fourth stage driven gear is rotatably mounted on the second output shaft.

8. The powertrain apparatus of claim 6, wherein the second common gear is gear-meshed with a fifth stage driven gear of the first output shaft to form the plurality of gear pairs, and is gear-meshed with a third stage driven gear of the second output shaft to form the plurality of gear pairs.

9. The powertrain apparatus of claim 8, wherein the fifth stage driven gear is rotatably mounted on the first output shaft and the third stage driven gear is rotatably mounted on the second output shaft.

10. The powertrain apparatus of claim 8, wherein a second clutch module having a synchronizer configured to selectively intermit the fifth stage driven gear to the first output shaft and a synchronizer configured to selectively intermit the sixth stage driven gear to the first output shaft, is mounted between the fifth stage driven gear and the sixth stage driven gear on the first output shaft.

11. The powertrain apparatus of claim 10, wherein a third clutch module having a synchronizer configured to selectively intermit the third stage driven gear to the second output shaft and a synchronizer configured to selectively intermit the fourth stage driven gear to the second output shaft, is mounted between the third stage driven gear and the fourth stage driven gear on the second output shaft.

12. The powertrain apparatus of claim 1, wherein the plurality of gear pairs mounted between the motor input shaft and the first output shaft are to implement two gear ratios having largest gear ratios in sequence among a series of shifting stages to be implemented.

13. The powertrain apparatus of claim 1, wherein the motor is mounted to transmit power to the motor input shaft through a reduction driving gear engaged with a first stage driving gear or a second stage driving gear of the motor input shaft.

14. The powertrain apparatus of claim 1, wherein a planetary gear that reduces power of the motor and transmits a reduced power to the motor input shaft is mounted between the motor and the motor input shaft.

15. A powertrain apparatus comprising:

a first shifting module including a motor input shaft having a motor directly connected to the motor shaft and provided to form two shifting stages having largest gear ratios in sequence among a series of shifting stages;

a second shifting module including an engine input shaft concentrically mounted with the motor input shaft and connected to an engine through a main clutch, and mounted to form remaining shifting stages of the series of the shifting stages;

a center synchro mounted to selectively intermit the motor input shaft and the engine input shaft; and a continuous variable device mounted to implement a state in which the first shifting module forms a gear ratio smaller than a shifting stage having a predetermined gear ratio among the shifting stages of the first shifting module by a continuously controlled friction force, wherein the continuous variable device is configured so that the friction force is continuously controlled by a sleeve of the center synchro, and wherein the first shifting module includes:

a first output shaft mounted in parallel to the motor input shaft;

a first stage driving gear mounted on the motor input shaft and a first stage driven gear mounted on the first output shaft to implement a first stage among the two shifting stages;

a second stage driving gear mounted on the motor input shaft and a second stage driven gear mounted on the first output shaft to implement a second stage among the two shifting stages; and a first clutch module having a synchronizer configured to selectively intermit the first stage driven gear to the first output shaft and a dog clutch configured to selectively intermit the second stage driven gear to the first output shaft.

16. The powertrain apparatus of claim 15, wherein the continuous variable device includes:

a first connection gear rotatably mounted on the motor input shaft;

a second connection gear mounted on the first output shaft such that rotation thereof is intermitted; and a cone clutch mounted to be driven by the sleeve of the center synchro and implement a continuous change of torque transmitted between the first connection gear and the motor input shaft by the continuously controlled friction force.

* * * * *